UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PLASTIC COMPOSITION.

1,188,797.  Specification of Letters Patent.  Patented June 27, 1916.

No Drawing. Application filed May 23, 1912. Serial No. 699,233.

*To all whom it may concern:*

Be it known that I, WILLIAM G. LINDSAY, a citizen of the United States, residing in Caldwell, county of Essex, State of New Jersey, have invented certain new and useful Improvements in Plastic Compositions, of which the following is a description.

The various compositions to which the present invention relates are employed in the arts, sometimes as imitations of natural substances and sometimes as films which are used for photographic purposes—as the base upon which the sensitive coating is superimposed. Although the final or useful form of the different compounds of acetyl cellulose is that of a solid or dry material, the different processes of conversion into this final solid form involve, as is well understood, the employment of solvents or mixtures of varying consistencies as to elasticity, stiffness, or fluidity, depending generally upon the proportion or kind of solvent used to the amount of the original base—acetyl cellulose.

In the treatment of acetyl cellulose for the production of flexible or plastic compounds I have discovered that water, methyl alcohol, and benzol in admixture form a useful and very strong solvent for acetyl cellulose of that variety which is freely soluble in acetone.

My invention lies in the discovery that methyl alcohol, water, and benzol when mixed in certain proportions combine to produce a liquid which is a solvent for the described variety of acetyl cellulose at ordinary room temperature, say 20° C., and that the use of this solvent under certain conditions for the manufacture of acetyl cellulose plastic compounds affords means of producing a material having great toughness, flexibility, and to a very large extent freedom from brittleness. The qualities thus imparted to the finished material I have found further are of a permanent nature and that the product when thoroughly seasoned is well adapted for carving, molding, and polishing. I have also discovered that this solvent may be employed for the manufacture of a non-inflammable plastic composition which will possess toughness, flexibility, and freedom from brittleness to a marked degree, and this I have formed the subject of this separate application.

It could not be foretold that a mixture of water, methyl alcohol and benzol would when added to an acetyl cellulose of the variety described produce a gelatinated mass, and again it could not be foretold that the addition of paraethyltoluolsulfonamid to this mixture would produce a mass which could be rolled, pressed, and molded. On the contrary, it would be expected that a mixture of water and methyl alcohol with benzol would yield upon evaporation a residue high in benzol and water and would be useless as a solvent for acetyl cellulose. As a matter of fact, however, I have not only discovered that the water-benzol-methyl alcohol mixture in certain proportions is a solvent for acetyl cellulose in the cold or at ordinary room temperature, but that such mixture when used with the acetyl cellulose described and certain substances such as paraethyltoluolsulfonamid evaporates substantially unchanged with very little, if any, diminution in its solvent action;—that is, whatever change (if any) takes place in the composition of the mixed solvent during evaporation its use as a solvent in the manufacture of acetyl cellulose plastics is not impaired.

I have further discovered that all of the so-called camphor substitutes are not equivalent in the preparation of acetyl cellulose plastic masses by means of the herein-described mixed solvents. Triphenyl phosphate, for instance, when used in sufficient quantity, say, from 25 to 30 parts, imparts non-inflammability to the resultant mass, but requires the addition of a sufficiently strong solid solvent such as paraethyltoluolsulfonamid to permit of the necessary subsequent manipulation to produce a material of the desired toughness and moldability.

In order to carry out my invention a good example of the process to be pursued is as follows:—To 100 parts of acetyl cellulose of the variety described I add from 50 to 100 parts of a mixture composed of from 54 to 61 parts, by weight, of the so-called "Commercial C. P." benzol and 46 to 39 parts, by weight, of a methyl alcohol of a strength of from 93% to 96.5%. Other proportions will produce gelatinization, but those give the best results with paraethyltoluolsulfonamid. At ordinary room temperature there results a more or less gelatinous mass depending upon the amount of solvent used, in which the particles of acetyl cellulose in a comparatively short time become completely agglomerated or amalgamated, losing their original shape and coalescing more or less without the action of either heat or pressure. To 100 parts of acetyl cellulose which has been gelatinated by means of the water-methyl alcohol-benzol mixture in the proportion, of, say, 60 parts I add 25 parts of triphenyl phosphate and 20 to 30 parts of paraethyltoluolsulfonamid. The mass is then subjected to kneading or malaxating action and after thorough incorporation of the different constituents and a uniform mixture is obtained about 25 parts of the volatile solvents are allowed to evaporate under the action of further mixing. The product thus obtained is shaped up, rolled, and pressed into blocks for sheeting, and further finished according to the processes well known for making nitro-cellulose-camphor compounds.

Having thus described my invention, what I claim is:—

1. The composition of matter which comprises acetyl cellulose of that variety which is freely soluble in acetone, water, methyl alcohol, benzol, triphenyl phosphate and paraethyltoluolsulfonamid, substantially as described.

2. The composition of matter which comprises acetyl cellulose of that variety which is freely soluble in acetone, aqueous methyl alcohol containing about $3\frac{1}{2}$ to 7 per cent. of water, benzol, triphenyl phosphate and paraethyltoluolsulfonamid, substantially as described.

WILLIAM G. LINDSAY.

Witnesses:
 RUTH MEYERSON,
 J. E. HINDOUTHYDE.